US006212618B1

(12) United States Patent
Roussel

(10) Patent No.: US 6,212,618 B1
(45) Date of Patent: *Apr. 3, 2001

(54) APPARATUS AND METHOD FOR PERFORMING MULTI-DIMENSIONAL COMPUTATIONS BASED ON INTRA-ADD OPERATION

(75) Inventor: Patrice L. Roussel, Portland, OR (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/053,388

(22) Filed: Mar. 31, 1998

(51) Int. Cl.$^7$ .................................................. G06F 9/302
(52) U.S. Cl. ............................ 712/7; 712/222; 708/603; 708/607; 345/522
(58) Field of Search ................... 708/603, 607; 712/7, 22, 20, 222; 345/522

(56) References Cited

U.S. PATENT DOCUMENTS

| 5,859,790 | | 1/1999 | Sidwell . | |
| 5,875,355 | * | 2/1999 | Sidwell et al. | 712/300 |
| 5,880,984 | * | 3/1999 | Burchfiel et al. | 708/576 |
| 5,887,186 | | 3/1999 | Nakanishi . | |
| 5,901,301 | * | 5/1999 | Matsuo et al. | 712/212 |
| 5,918,062 | | 6/1999 | Oberman et al. . | |
| 5,983,257 | * | 11/1999 | Dulong et al. | 708/603 |

OTHER PUBLICATIONS

Visual Instruction Set (VIS#) User's Guide, Sun Microsystems, Version 1.1, Mar. 1997.
AMD–3D Technology Manual, AMD, Publication No. 21928, Issued Date: Feb. 1998.
MIPS Extension for Digital Media with 3D, MIPS Technology, Inc., Mar. 12, 1997, pp 0–26.
A Procesor Architecture for 3D Graphics Calculations, Yulun Wang, Amante Manager, Partha Srinivasan, Computer Motion, Inc., pp 1–23.
Parallel Computers for Graphics Applications (Proceedings: Second International Conference . . . ), Levinthal, et al., 1987, pp 193–198.
A SIMD Graphics Processor, Adam Levinthal, Thomas Porter, 1984, pp 77–82.
Architecture of a Broadband Mediaprocessor (Proceedings of COMPCON '96), Craig Hansen, 1996, pp 334–354.
64–bit and Multimedia Extensions in the PA–RISC 2.0 Architecture, Computing Directory Technologies Precision Architecture Document, Jul. 17, 1997.
Silicon Graphics Introduces Enchanced MIPS Architecture to Lead the Interactive Digital Revolution, Oct. 21, 1996.
21164 Alpha Microprocessor Data Sheet, Samsung Electronics, 1997.
TM100–Preliminary Data Book, Philips Semiconductors, Jul. 1, 1997, pp A–74, A133–138, A161.

* cited by examiner

Primary Examiner—William M. Treat
(74) Attorney, Agent, or Firm—Blakely, Sokoloff, Taylor & Zafman LLP

(57) ABSTRACT

A method and apparatus for including in a processor, instructions for performing multiply-intra-add operations on packed data is described. In one embodiment, a processor is coupled to a memory. The memory has stored therein a first and a second packed data. The processor performs operations on data elements in the first packed data and the second packed data to generate a plurality of data elements in a third packed data in response to receiving an instruction. At least two of the plurality of data elements in the third packed data store the result of multiply-intra-add operations.

21 Claims, 13 Drawing Sheets

INTRA-ADD: IRESULT1-IRESULT1; I RESULT2-IRESULT2

| 127 | 96 | 95 | 64 | 63 | 32 | 31 | 0 | |
|---|---|---|---|---|---|---|---|---|
| $A_{14}X_4$ | | $A_{13}X_3$ | | $A_{12}X_2$ | | $A_{11}X_1$ | | IResult1 |

| 127 | 96 | 95 | 64 | 63 | 32 | 31 | 0 | |
|---|---|---|---|---|---|---|---|---|
| $A_{24}X_4$ | | $A_{23}X_3$ | | $A_{22}X_2$ | | $A_{21}X_1$ | | IResult2 |

| 127 | 96 | 95 | 64 | 63 | 32 | 31 | 0 |
|---|---|---|---|---|---|---|---|
| $A_{24}X_4+A_{23}X_3$ | | $A_{22}X_2+A_{21}X_1$ | | $A_{14}X_4+A_{13}X_3$ | | $A_{12}X_2+A_{11}X_1$ | |

IAResult1

MULTIPLY - SOURCE 1, SOURCE 2
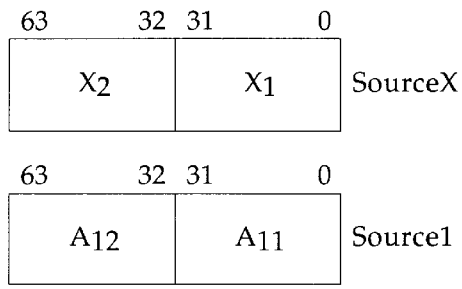
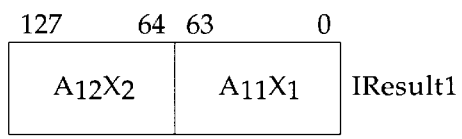
FIGURE 3A
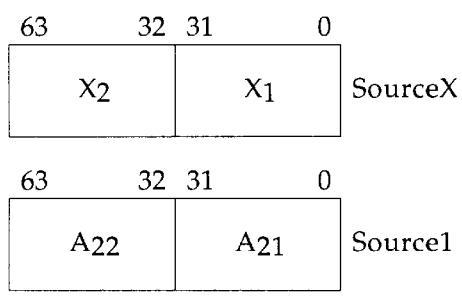
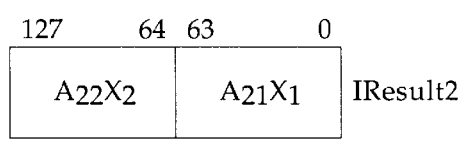
FIGURE 3B INTRA-ADD: DATA ELEMENTS OF IRESULT2; IRESULT1
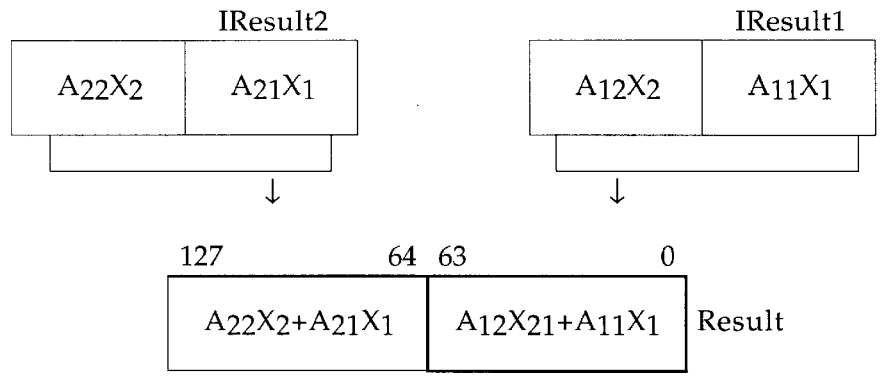
FIGURE 3C
MULTIPLY: SOURCE1, SOURCE2
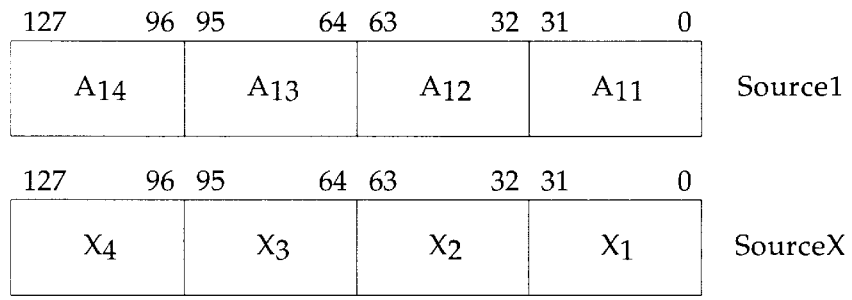
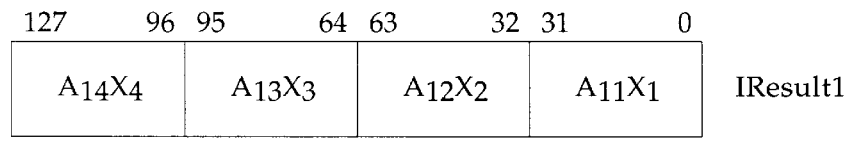
FIGURE 4A

| 127 96 | 95 64 | 63 32 | 31 0 | |
|---|---|---|---|---|
| A24 | A23 | A22 | A21 | Source2 |

| 127 96 | 95 64 | 63 32 | 31 0 | |
|---|---|---|---|---|
| X4 | X3 | X2 | X1 | SourceX |

| 127 96 | 95 64 | 63 32 | 31 0 | |
|---|---|---|---|---|
| A24X4 | A23X3 | A22X2 | A21X1 | IResult2 |

FIGURE 4B

| 127 96 | 95 64 | 63 32 | 31 0 | |
|---|---|---|---|---|
| A34 | A33 | A32 | A31 | Source3 |

| 127 96 | 95 64 | 63 32 | 31 0 | |
|---|---|---|---|---|
| X4 | X3 | X2 | X1 | SourceX |

| 127 96 | 95 64 | 63 32 | 31 0 | |
|---|---|---|---|---|
| A34X4 | A33X3 | A32X2 | A31X1 | IResult3 |

FIGURE 4C

INTRA-ADD: IRESULT1-IRESULT1; I RESULT2-IRESULT2

| 127    96 | 95    64 | 63    32 | 31    0 | |
|---|---|---|---|---|
| $A_{14}X_4$ | $A_{13}X_3$ | $A_{12}X_2$ | $A_{11}X_1$ | IResult1 |

| 127    96 | 95    64 | 63    32 | 31    0 | |
|---|---|---|---|---|
| $A_{24}X_4$ | $A_{23}X_3$ | $A_{22}X_2$ | $A_{21}X_1$ | IResult2 |

---

| 127    96 | 95    64 | 63    32 | 31    0 |
|---|---|---|---|
| $A_{24}X_4+A_{23}X_3$ | $A_{22}X_2+A_{21}X_1$ | $A_{14}X_4+A_{13}X_3$ | $A_{12}X_2+A_{11}X_1$ |

IAResult1

FIGURE 4E

INTRA-ADD: IRESULT3-IRESULT3; I RESULT4-IRESULT4

| 127   96 | 95   64 | 63   32 | 31   0 | |
|---|---|---|---|---|
| A34X4 | A33X3 | A32X2 | A31X1 | IResult3 |

| 127   96 | 95   64 | 63   32 | 31   0 | |
|---|---|---|---|---|
| A44X4 | A43X3 | A42X2 | aA41X1 | IResult4 |

| 127   96 | 95   64 | 63   32 | 31   0 | |
|---|---|---|---|---|
| A44X4+A43X3 | A42X2+A41X1 | A34X4+A33X3 | A32X2+A31X1 | |

IAResult2

FIGURE 4F

INTRA-ADD

| 127 96 | 95 64 | 63 32 | 31 0 |
|---|---|---|---|
| $A_{24}X_4+A_{23}X_3$ | $A_{22}X_2+A_{21}X_1$ | $A_{14}X_4+A_{13}X_3$ | $A_{12}X_2+A_{11}X_1$ |

IAResult1

| 127 96 | 95 64 | 63 32 | 31 0 |
|---|---|---|---|
| $A_{44}X_4+A_{43}X_3$ | $A_{42}X_2+A_{41}X_1$ | $A_{34}X_4+A_{33}X_3$ | $A_{32}X_2+A_{31}X_1$ |

IAResult2

| 127 96 | 95 64 | 63 32 | 31 0 |
|---|---|---|---|
| $A_{44}X_4+A_{43}X_3+$ $A_{42}X_2+A_{41}X_1$ | $A_{34}X_4+A_{33}X_3+$ $A_{32}X_2+A_{31}X_1$ | $A_{24}X_4+A_{23}X_3+$ $A_{22}X_2+A_{21}X_1$ | $A_{14}X_4+A_{13}X_3+$ $A_{12}X_2+A_{11}X_1$ |

Result

FIGURE 4G

APPARATUS AND METHOD FOR PERFORMING MULTI-DIMENSIONAL COMPUTATIONS BASED ON INTRA-ADD OPERATION

BACKGROUND OF THE INVENTION

1. Field of the Invention

The present invention relates in general to the field of computer systems, and in particular, to an apparatus and method for performing multi-dimensional computations based on an intra-add operation.

2. Description of the Related Art

To improve the efficiency of multimedia applications, as well as other applications with similar characteristics, a Single Instruction, Multiple Data (SIMD) architecture has been implemented in computer systems to enable one instruction to operate on several operands simultaneously, rather than on a single operand. In particular, SIMD architectures take advantage of packing many data elements within one register or memory location. With parallel hardware execution, multiple operations can be performed on separate data elements with one instruction, resulting in significant performance improvement.

Currently, the SIMD addition operation only performs "vertical" or inter-register addition, where pairs of data elements, for example, a first element Xn (where n is an integer) from one operand, and a second element Yn from a second operand, are added together. An example of such a vertical addition operation is shown in FIG. 1, where the instruction is performed on the sets of data elements ($X_3$, $X_2$, $X_1$ and $X_0$) and ($Y_3$, $Y_2$, $Y_1$, and $Y_0$) accessed as Source1 and Source2, respectively to obtain the result ($X_3+Y_3$, $X_2+Y_2$, $X_1+Y_1$, and $X_0+Y_0$).

Although many applications currently in use can take advantage of such a vertical add operation, there are a number of important applications which would require the rearrangement of the data elements before the vertical add operation can be implemented so as to provide realization of the application.

For example, a matrix multiplication operation is shown below.

$$\text{MATRIX } A * \text{VECTOR } X = \text{VECTOR } Y$$

$$\begin{pmatrix} A_{14} & A_{13} & A_{12} & A_{11} \\ A_{24} & A_{23} & A_{22} & A_{21} \\ A_{34} & A_{33} & A_{32} & A_{31} \\ A_{44} & A_{43} & A_{42} & A_{41} \end{pmatrix} \times \begin{pmatrix} X_4 \\ X_3 \\ X_2 \\ X_1 \end{pmatrix} = \begin{pmatrix} A_{14}X_4 + A_{13}X_3 + A_{12}X_2 + A_{11}X_1 \\ A_{24}X_4 + A_{23}X_3 + A_{22}X_2 + A_{21}X_1 \\ A_{34}X_4 + A_{33}X_3 + A_{32}X_2 + A_{31}X_1 \\ A_{44}X_4 + A_{43}X_3 + A_{42}X_2 + A_{41}X_1 \end{pmatrix}$$

To obtain the product of the matrix A with a vector X to obtain the resulting vector Y, instructions are used to: 1) store the columns of the matrix A as packed operands (this typically requires rearrangement of data because the rows of the matrix A coefficients are stored to be accessed as packed data operands, not the columns); 2) store a set of operands that each have a different one of the vector X coefficients in every data element; 3) use vertical multiplication where each data element in the vector X (i.e., $X_4$, $X_3$, $X_2$, $X_1$) has to be first multiplied with data elements in each column (for example, [$A_{14}$, $A_{24}$, $A_{34}$, $A_{44}$]) of the matrix A. The results of the multiplication operations are then added together through three vertical add operations such as that shown in FIG. 1, to obtain the final result. Such a matrix multiplication operation based on the use of vertical add operations typically requires 20 instructions to implement, an example of which is shown below in Table 1.

Exemplary Code Based on Vertical-Add Operations:
Assumptions:

TABLE 1

1/X stored With X1 first, X4 last
2/transposed of A stored with A11 first, A21 second, A31 third, etc.
3/availability of:
    DUPLS: duplicate once
    DUPLD: duplicate twice

| | | |
|---|---|---|
| MOVD | mm0, <mem_X> | / /[0,0,0,X1] |
| DUPLS | mm0, mm0 | / /[0,0,X1,X1] |
| DUPLD | mm0, mm0 | / /[X1,X1,X1,X1] |
| PFMUL | mm0, <mem_A> | / /[A41*X1,A31*X1,A21*X1,A11*X1] |
| MOVD | mm1, <mem_X+4> | / /[0,0,0,X2] |
| DUPLS | mm1, mm1 | / /[0,0,X2,X2] |
| DUPLD | mm1, mm1 | / /[X2,X2,X2,X2] |
| PFMUL | mm1, <mem_A+16> | / /[A42*X2,A32*X2,A22*X2,A12*X2] |
| MOVD | mm2, <mem_X+8> | / /[0,0,0,X3] |
| DUPLS | mm2, mm2 | / /[0,0,X3,X3] |
| DUPLD | mm2, mm2 | / /[X3,X3,X3,X3] |
| PFMUL | mm2, <mem_A+32> | / /[A43*X3,A33*X3,A23*X3,A13*X3] |
| MOVD | mm3, <mem_X+12> | / /[0,0,0,X4] |
| DUPLS | mm3, mm3 | / /[0,0,X4,X4] |
| DUPLD | mm3, mm3 | / /[X4,X4,X4,X4] |
| PFMUL | mm3, <mem_A+48> | / /[A44*X4,A34*X4,A24*X4,A14*X4] |
| PFADD | mm0, mm1 | / /[A42*X2+A41*X1,A32*X2+A31*X1, /A22*X2+A21*X1,A12*X2+A11*X1] |
| PFADD | mm2, mm3 | / /[A44*X4+A43*X3,A34*X4+A33*X3, /A24*X4+A23*X3,A14*X4+A13*X3] |
| PFADD | mm0, mm2 | / /[A44*X4+A43*X3+A42*X2+A41*X1, /A34*X4+A33*X3+A32*X2+A31*X1, /A24*X4+A23*X3+A22*X2+A21*X1, /A14*X4+A13*X3+A12*X2+A11*X1] |
| MOVDQ | <mem_Y>, mm0 | / /store[Y4,Y3,Y2,Y1] |

Accordingly, there is a need in the technology for providing an apparatus and method which efficiently performs multi-dimensional computations based on a "horizontal" or intra-add operation. There is also a need in the technology for a method and operation for increasing code density by eliminating the need for the rearrangement of data elements and the corresponding rearrangement operations.

BRIEF SUMMARY OF THE INVENTION

A method and apparatus for including in a processor, instructions for performing multiply-intra-add operations on packed data is described. In one embodiment, a processor is coupled to a memory. The memory has stored therein a first and a second packed data. The processor performs operations on data elements in the first packed data and the second packed data to generate a plurality of data elements in a third packed data in response to receiving an instruction. At least two of the plurality of data elements in the third packed data store the result of multiply-intra-add operations.

BRIEF DESCRIPTION OF THE DRAWINGS

The invention is illustrated by way of example, and not limitation, in the figures. Like reference indicate similar elements.

FIG. 3A–3C illustrate matrix multiplication based on horizontal or intra-add operations in accordance with one embodiment of the present invention.

FIG. 4A–4G illustrate matrix multiplication based on horizontal or intra- add operations in accordance with another embodiment of the present invention.

DETAILED DESCRIPTION OF THE INVENTION

In the following description, numerous specific details are set forth to provide a thorough understanding of the invention. However, it is understood that the invention may be practiced without these specific details. In other instances, well-known circuits, structures and techniques have not been shown in detail in order not to obscure the invention.

OVERVIEW

Figure 1:
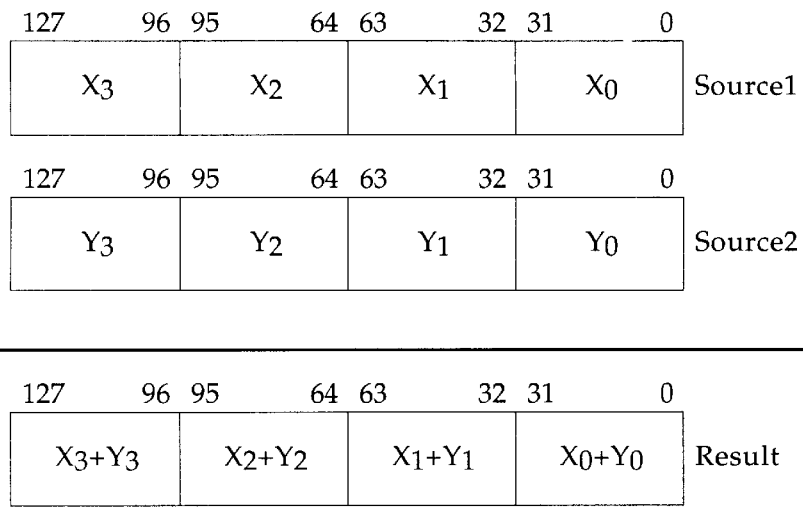
FIG. 1 illustrates the vertical or inter-add operation of the prior art.
Figure 2:
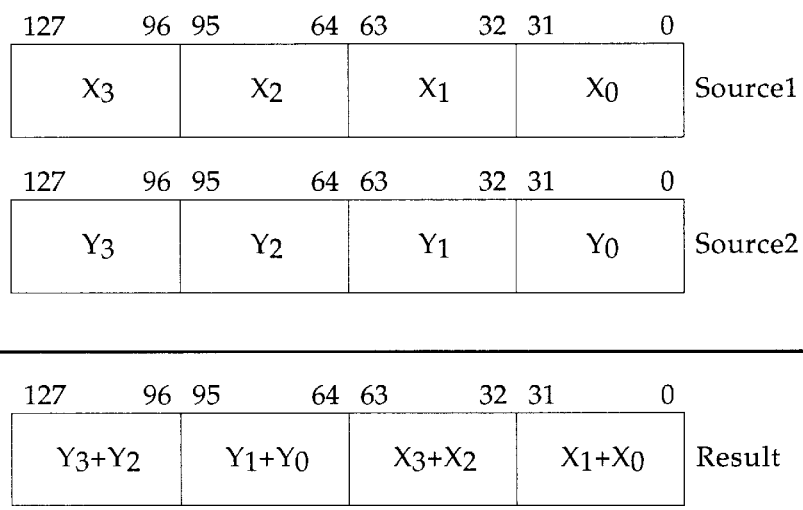
FIG. 2 illustrates the horizontal or intra-add operation in accordance with one embodiment of the present invention.
Figure 4D:
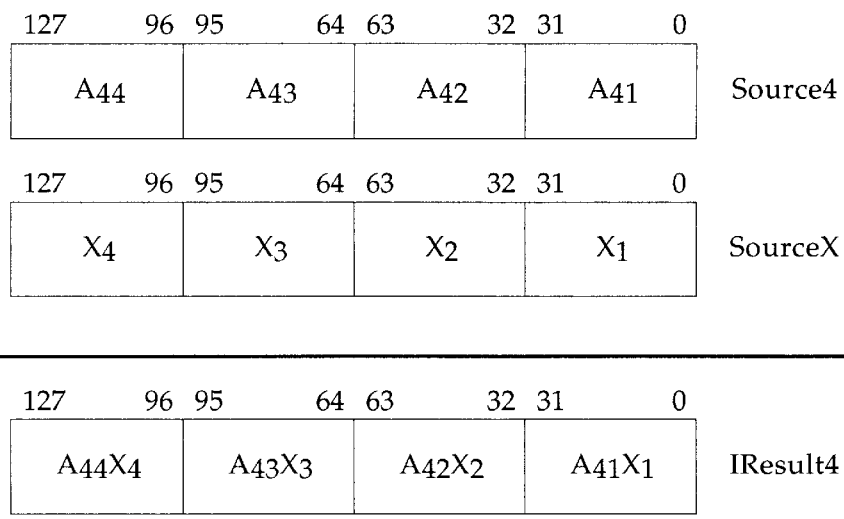

One aspect of the present invention is a processor including instructions for performing horizontal or intra-addition operations on packed data. In one embodiment, two pairs of data elements (e.g., $X_3$ and $X_2$, and $X_1$ and $X_0$) located within a single storage area (e.g., Source1) are added together using a horizontal or a intra-add operation. In an alternate embodiment, data elements from each of two storage areas (e.g., Source1 and Source2) are added and stored as data elements of a resulting packed data, as shown in FIG. 2.

Another aspect of the present invention involves a method and apparatus for performing matrix multiplication using a horizontal or intra-addition operation. In one embodiment, each 32-bit data element from a 1×2 vector is multiplied with corresponding 32-bit data elements from each row of a 2×2 matrix, as shown in FIGS. 3A and 3B, generating two pairs of 64-bit intermediate results, each pair of which are stored in separate storage areas. An intra-add operation is performed on each pair of the intermediate results to generate a pair of data elements, which are stored as a packed result, as shown in FIG. 3C. The example on FIGS. 3A–3C illustrate the application of one embodiment of the present invention using an integer data format in which the full width of the result is stored in a result register. In alternative embodiments, the result register is the same size as the source register.

The operation of a further example of a matrix multiplication operation based on intra-add operations is shown in FIGS. 4A through 4G, and is representative of a multiplication operation between a 4×4 matrix and a 4×1 vector (such as the multiplication of a 4×4 matrix A with a 4×1 vector X to provide a 4×1 vector Y as described earlier). In particular, each data element from a 4×1 vector is multiplied with the corresponding data elements from each row of a 4×4 matrix, as shown in FIGS. 4A through 4D.

A first pair of intra-add operations are then performed on the initial resulting data elements (IResult1+IResult2, IResult3+IResult4), as shown in FIG. 4E and 4F; followed by a second single intra-add operation on the results of the first intra-add operations (IAResult1+IAResult2), to obtain the final result (Result) as shown in FIG. 4G.

Although the examples illustrated in FIGS. 4A–4G are floating point examples, the present invention may also be applied to packed integer data. Matrix multiplication based on horizontal add or intra-add operations only requires 12 instructions, as compared to the typical 20 instructions required when the same matrix multiplication is performed using vertical add or inter-add operations. Exemplary code for implementing matrix multiplication based on horizontal add or intra-add operations is shown in Table 2:

Exemplary Code Based on Horizontal-Add Operations

PFADDM represents the Intra-add instruction of the present invention.

Assumptions:

TABLE 2

1/X stored with X1 first, X2 second, . . . , X4 last
2/A stored with A11 first, A12 second, A13 third, etc.

| | | |
|---|---|---|
| MOVDQ | mm0, <mem_X> | / /[X4,X3,X2,X1] |
| MOVDQ | mm3, mm0 | |
| PFMUL | mm0, <mem_A> | / /[A14*X4,A13*X3,A12*X2,A11*X1] |
| MOVDQ | mm1, mm3 | |
| PFMUL | mm1, <mem_A+16> | / /[A24*X4,A23*X3,A22*X2,A21*X1] |
| MOVDQ | mm2, mm3 | |
| PFMUL | mm2, <mem_A+32> | / /[A34*X4,A33*X3,A32*X2,A31*X1] |
| PFMUL | mm3, <mem_A+48> | / /[A44*X4,A43*X3,A42*X2,A41*X1] |
| PFADDM | mm0, mm1 | / /[A24*X4+A23*X3,A22*X2+A21*X1, / /A14*X4+A13*X3,A12*X2+A11*X1] |
| PFADDM | mm2, mm3 | / /[A44*X4+A43*X3,A42*X2+A41*X1, / /A34*X4+A33*X3,A32*X2+A31*X1] |
| PFADDM | mm0, mm2 | / /[A44*X4+A43*X3+A42*X2+A41*X1, / /A34*X4+A33*X3+A32*X2+A31*X1], / /A24*X4+A23*X3+A22*X2+A21*X1, / /A14*X4+A13*X3+A12*X2+A11*X1] |
| MOVDQ | <mem_Y>, mm0 | / /store [Y4,Y3,Y2,Y1] |

Although the discussions above pertain to a horizontal-add or intra-add instruction, alternative embodiments could in addition to, or in place of the intra-add instruction, have an intra-subtract instruction or element operation. In this case, one of a pair of data elements within a packed data will be subtracted from a second element of the pair of data elements to accomplish the inter-subtract operations.

In addition, although the discussions above pertain to packed operands that have four data elements, alternative embodiments may involve packed operands that have at least two data elements (i.e., that are double wide).

COMPUTER SYSTEM

Figure 5:
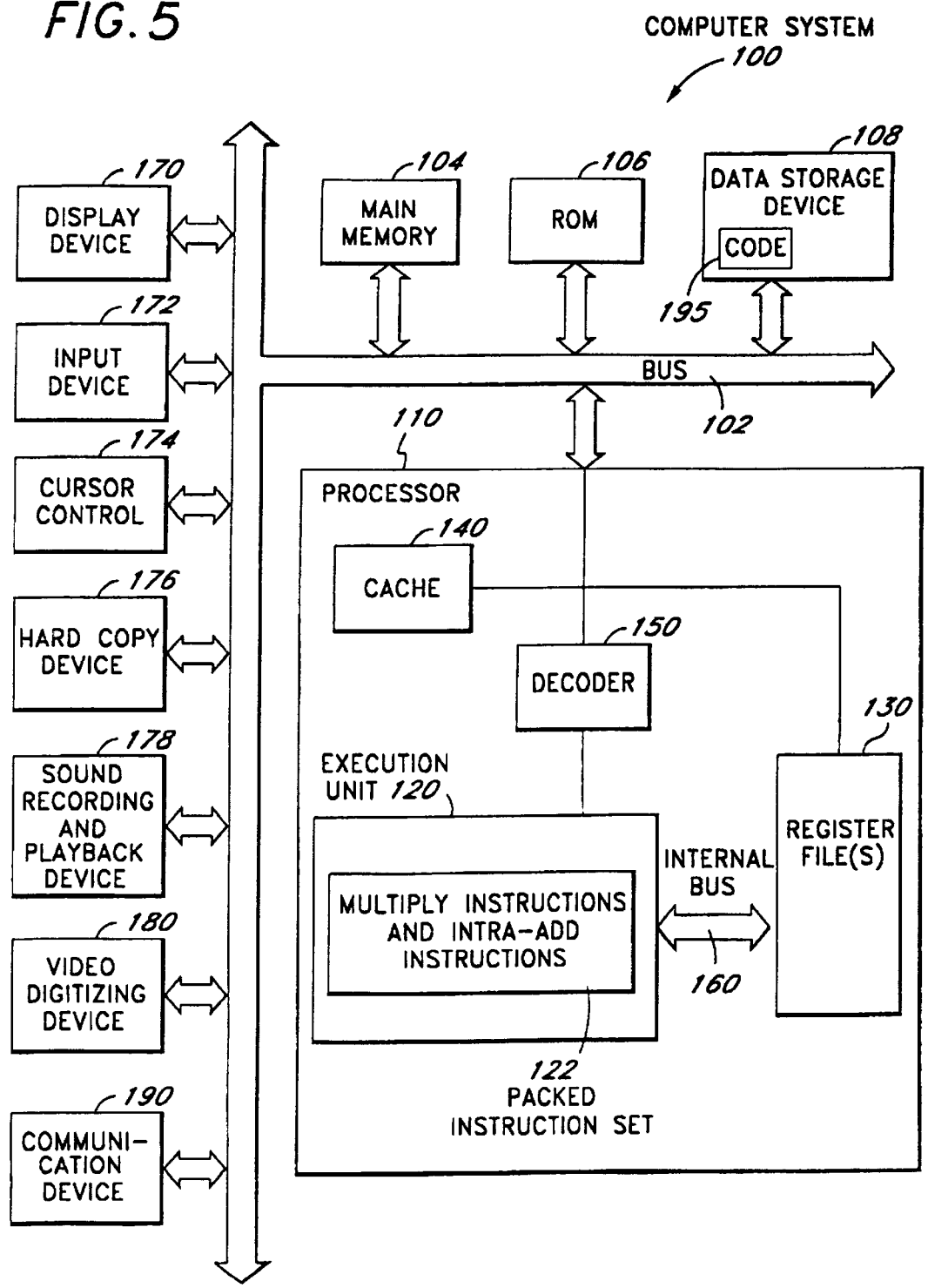
FIG. 5 illustrates an exemplary computer system in accordance with one embodiment of the invention.

FIG. 5 illustrates one embodiment of a computer system 100 which implements the principles of the present invention. Computer system 100 comprises a bus 102 for communicating information, and a processor 110 for processing information. In one embodiment, the bus 102 may be any communications hardware and/or software for communicating information. The processor 110 represents a central processing unit of any type of architecture, examples of which include a CISC, a RISC or a VLIW type architecture. Computer system 100 further comprises a main memory 104 that is coupled to bus 102, for storing information and instructions to be executed by the processor 110. Computer system 110 also comprises a read only memory (ROM) 106 and/or other status storage device, coupled to the bus 102 for storing information and instructions for access and execution by processor 110. In addition, computer system 110 comprises a data storage device 108 that is coupled to the bus 102 for storing information and instructions.

As shown in FIG. 5, processor 110 comprises an execution unit 120, a set of register file(s) 130, a cache memory 140, a decoder 150 and an internal bus 160. The processor 110 also includes additional circuitry (not shown) which is not necessary to the understanding of the present invention.

Execution unit 120 is used for executing instructions received by processor 110. In addition to recognizing instructions typically implemented in general purpose processors, execution unit 120 recognizes instructions in packed instruction set 122 for performing operations on packed data formats. Packed instruction set 122 includes instructions for supporting intra-add and multiply operations. In addition, packed instruction set 122 may also include other packed instructions.

Execution unit 120 is coupled to register file 130 by internal bus 160. Register file 130 represents a storage area on processor 110 for storing information, including data. It is understood that the aspects of the invention are the described intra-add instruction set and a code sequence for performing matrix multiplication for operating on packed data. According to these aspects of the invention, the storage area used for storing the packed data is not critical. Execution unit 120 is coupled to cache 140 and decoder 150. Cache 140 is used to cache data and/or control signals (such as instructions) from, for example, main memory 104. Decoder 150 is used for decoding instructions received by processor 110 into control signals and/or microcode entry points. In response to these control signals and/or microcode entry points, execution unit 120 performs the appropriate operations. Decoder 150 may be implemented using any number of different mechanisms (e.g., a look-up table, a hardware implementation, a PLA, etc.).

FIG. 5 additionally shows a data storage device 108, (e.g., a magnetic disk, optical disk, and/or other machine readable media) coupled to computer system 100. In addition, the data storage device 108 is shown including code 195 for execution by the processor 110. The code 195 can be written to cause the processor 110 to perform matrix multiplication with the intra-add instruction for any number of purposes (e.g., 3-D graphics multiplication, 3-D transformation, 3-D rotation, 3-D scaling, etc.). Computer system 100 can also be coupled via bus 102 to a display device 170, a user input device 172, a hard copy device 176, a sound recording and/or playback device 178, a video digitizing device 180, and/or a communications device 190 (e.g., a serial communications chip, an ethernet chip or a modem, which provides communications with an external device or network).

DATA AND STORAGE FORMATS

Generally, a data element is an individual piece of data that is stored in a single register (or memory location) with other data elements of the same length. The number of data elements stored in a register is the number of bits supported by the packed data format (e.g., 64 bits for integer packed data) divided by the length in bits of a data element. While any number of packed data formats can be used, FIGS. 6–7, respectively, illustrate integer and floating-point packed data-types according to one embodiment of the invention.

Figure 6:
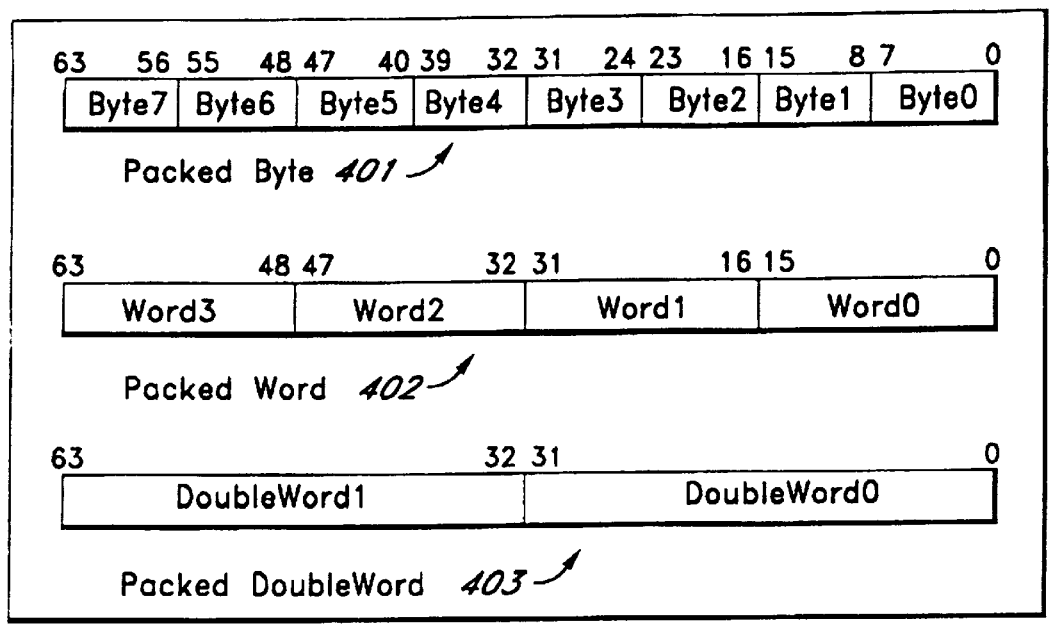
FIG. 6 illustrates packed data-types in accordance with one embodiment of the invention.

Three integer packed data formats are illustrated in FIG. 6: packed byte 401, packed word 402, and packed doubleword 403. While in one embodiment, each of the packed data formats in FIG. 6 can be either signed or unsigned formats, alternative embodiments support only signed or unsigned formats. Packed byte 401, in one embodiment of the invention, is sixty-four bits long containing eight data elements. Each data element is one byte long. Packed word 402 is sixty-four bits long and contains four word 402 data elements. Each word 402 data element contains sixteen bits of information. Packed doubleword 403 is sixty-four bits long and contains two doubleword 403 data elements. Each doubleword 403 data element contains thirty-two bits of information.

Figure 7:
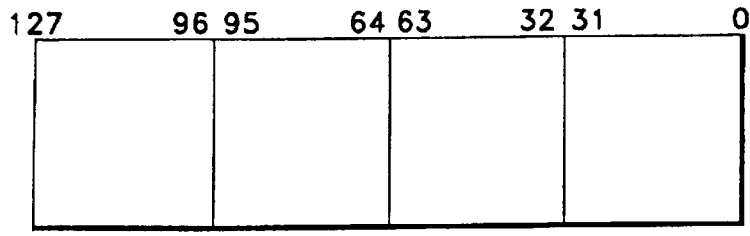
FIG. 7 illustrates one embodiment of a floating point packed data format.

FIG. 7 shows one floating point packed data format having four 32-bit data elements. While one floating point packed data format is illustrated, alternative embodiments could support a different and/or additional floating point packed data formats.

INTRA-ADD OPERATION(S)

In one embodiment of the invention, the SRC1 register contains packed data (Source1), the SRC2 register contains packed data (Source2) and the DEST register will contain the result (Result) of performing the horizontal add instruction on Source1 and Source2. In the first step of the horizontal add instruction, one or more pairs of data elements from Source1 are summed together. Similarly, one or more pairs of data elements from Source2 are summed together. The results of the instruction are then stored in the DEST register.

Figure 8:
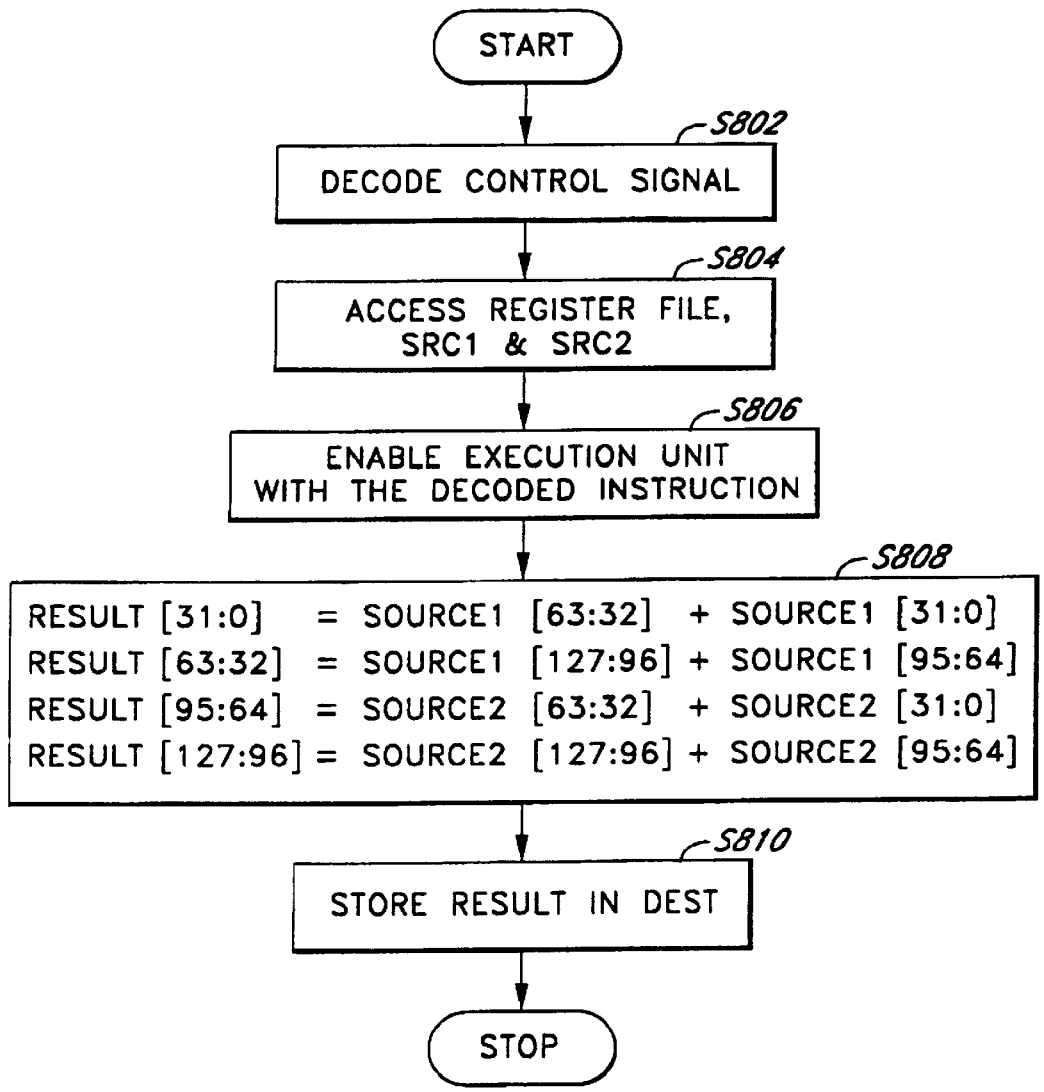
FIG. 8 is a flow diagram illustrating a method for performing the intra-add operation of FIG. 2 in accordance with one embodiment of the invention.

FIG. 8 is a flow diagram illustrating a process S800 for performing the intra-add operation of FIG. 2 according to one embodiment of the present invention. The process S800 begins from a start state and proceeds to process step S802, where the decoder 150 decodes the control signal received by processor 110. In particular, the decoder 150 decodes the operation code for the intra-add instruction.

The process S800 then advances to process step S804, where the device 150 accesses registers in register file 130 given the SRC1 602 and SRC2 603 addresses. Register file 130 provides the execution unit 120 with the packed data stored in the SRC1 602 register (Source1), and the packed data stored in SRC2 603 register (Source2).

The process S800 proceeds to process step S806, where the decoder 150 enables the execution unit 120 to perform the instruction. Next, the process S800 performs the following series of steps, as shown in process step S808 and FIG. 2. Source1 bits thirty-one through zero are added to Source1 bits sixty-three through thirty-two, generating a first 32-bit result (Result[31:0]). Source1 bits ninety-five through sixty-four are added to Source1 bits one hundred-and-twenty-seven through ninety-six, generating a second 32-bit result (Result[63:32]). Source2 bits thirty-one through zero are added to Source2 bits sixty-three through thirty-two, generating a first 32-bit result (Result[95:64]). Source 2 bits ninety-five through sixty-four are added to Source1 bits one hundred-and-twenty-seven through ninety-six, generating a second 32-bit result (Result[127:96]).

The process S800 advances to process step S810, where the results of the intra-add instruction are stored in DEST. The process S800 then terminates. Of course, the method of FIG. 8 can be easily altered to describe the horizontal addition of other packed data formats.

EXEMPLARY INTRA-ADD CIRCUIT

In one embodiment, the intra-add instructions can execute on multiple data elements in the same number of clock cycles as an intra-add operation on unpacked data. To achieve execution in the same number of clock cycles, parallelism is used.

Figure 9:
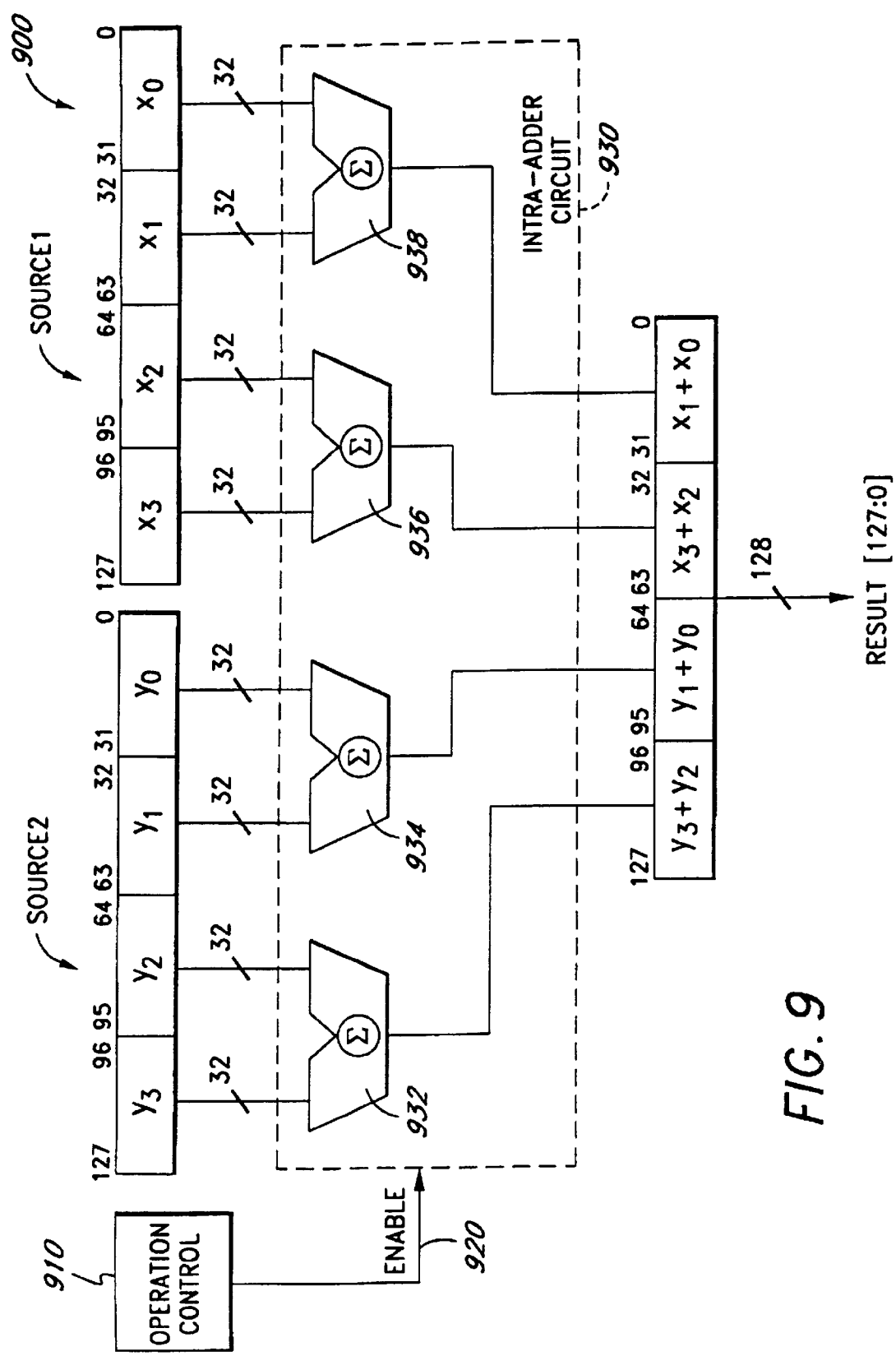
FIG. 9 illustrates a circuit for performing the intra-add operation of FIG. 2 in accordance with one embodiment of the invention.

FIG. 9 illustrates a circuit 900 for performing intra-add operation of FIG. 2 according to one embodiment of the invention. Operation control 910 processes the control signal for the intra-add operations. Operation control 910 outputs signals via signal line 920 to control intra-adder 930.

The intra-adder 930 receives inputs from Source1[127:0], Source2[127:0], and Enable 920. The intra-adder 930 includes four adder circuits 932, 934, 936 and 938. Adder 932 receives inputs from Source2[127:64], adder 934 receives inputs from Source2[63:0], adder 936 receives inputs from Source1[127:64], while adder 938 receives inputs from Source1[63:0]. When enabled, the adders 932, 934, 936 and 938 sum their respective inputs, and each generates a 32-bit output. The results of the addition by adder 932 (i.e., Result[127:96]), adder 934 (i.e., Result [95:64], by adder 936 (i.e., Result[63:32]), and by adder 938 (i.e., Result[31:0]) are combined into the 128-bit Result and communicated to the Result Register 940.

MATRIX MULTIPLICATION USING INTRA-ADD OPERATION(S)

Figure 10:
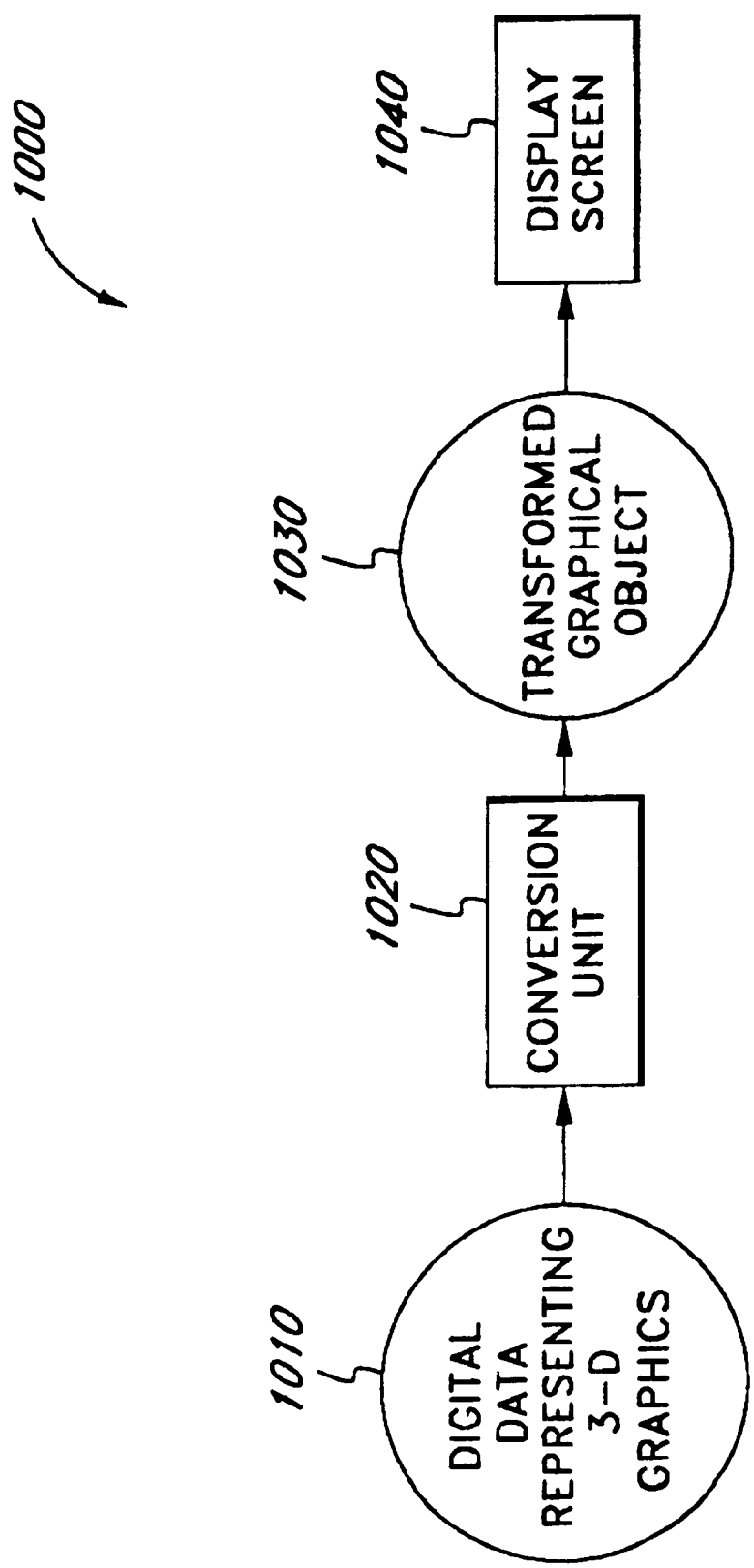
FIG. 10 is a general block diagram illustrating the use of matrix multiplication based on horizontal or inter-add operations, in rendering graphical objects in animation.

FIG. 10 is a general block diagram illustrating the use of matrix multiplication based on a horizontal or intra-add operation for rendering graphical objects in animation according to one embodiment of the invention. FIG. 10 shows a computer system 1000 containing digital data 1010 representing 3-dimensional (3D) graphics. The digital data 1010 may be read from a storage medium or generated real time. At sometime, the conversion unit 1020 alters data using 3D geometry (e.g., by performing a 3D transformation) through the implementation of matrix multiplication based on a horizontal add operation to rotate a 3D object in providing animation. The resulting graphical object 1030 (e.g., see FIGS. 4A–4G) is then displayed on a screen display 1040 using well known techniques. While FIG. 10 shows that the resulting graphical object 1030 is displayed, the resulting graphical object may alternatively be stored, transmitted, etc.

In one embodiment, the computer system 100 shown in FIG. 5 is used to implement the computer system 1000 from FIG. 10. In this embodiment, the digital data 1010 from FIG. 10 is any data stored in the storage device 110 representing 3D graphics. In one embodiment, the conversion unit 1020 from FIG. 8 is implemented using the processor 110 and the code 195 to alter data using 3D geometry. For example, data is altered to perform a transformation. In this embodiment, the processor 110, executing the code 195, performs the transformation and stores the transformed data 1030 for display.

CONCLUSION

The intra-add operation facilitates the efficient performance of multi-dimensional computations. It further increases code density by eliminating the need for the rearrangement of data elements and the corresponding rearrangement operations.

The present invention may be embodied in other specific forms without departing from its spirit or essential characteristics. The described embodiments are to be considered in all respects only as illustrative and not restrictive. The scope of the invention is, therefore, indicated by the appended claims rather than the foregoing description. All changes which come within the meaning and range of equivalency of the claims are to be embraced within their scope.

What is claimed is:

1. An apparatus for use in a computer system comprising:
a memory having stored therein a first packed data and a second packed data; and
a processor coupled to said memory to receive said first and said second packed data, said processor performing operations on a first plurality of data elements in said first packed data, and performing operations on a second plurality of data elements in said second packed data to generate a third plurality of data elements in a third packed data in response to receiving an instruction, at least two of said third plurality of data elements in said third packed data storing the result of multiply-intra-add operations.

2. The apparatus of claim 1, wherein said first packed data includes a first data element and a second data element, said second packed data includes a third data element and a fourth data element; and
said third packed data containing at least one data element representing the result of:
(said first data element multiplied by said third data element) added to (said second data element multiplied by said fourth data element).

3. The apparatus of claim 2, wherein said first, said second, said third and said fourth data elements and said at least one element data of said third packed data each comprises a predetermined number of bits.

4. The apparatus of claim 1, wherein said multiply-intra-add operation is performed with saturation.

5. An apparatus for use in a computer system comprising:
a first storage area;
a second storage area;
a circuit coupled to said first and said second storage areas, said circuit multiplying a value A by a value B to generate a first intermediate result, multiplying a value C by a value D to generate a second intermediate result, said first intermediate result being stored in a first element of said first storage area, said second intermediate result being stored in a second element of said first storage area, said circuit adding said first and said second elements of said first storage element to generate a value E, and storing said value E in said second storage area as an element of a first packed data.

6. The apparatus of claim 5, wherein said computer system further comprising:
a third storage area for storing said value A and said value C as data elements of a second packed data; and
a fourth storage area for storing said value B and said value D as data elements of a third packed data.

7. A computer system comprising:
a processor; and
a storage area coupled to said processor having stored therein
a multiply instruction for operating on a first packed data and a second packed data, said first packed data containing at least data elements A and B each including a predetermined number of bits, said second packed data containing at least data elements C and D each including said predetermined number of bits, said processor generating a third packed data containing at least elements E and F in response to receiving said multiply instruction, said data element E equal to (A×C) and said data element F equal to (B×D);
an intra-add instruction for operating on said data elements E and F of said third packed data, said processor generating a fourth packed data containing at least element G in response to receiving said intra add instruction, said data element G equal to (E+F).

8. The computer system of claim 7, wherein said processor further includes a first register, said processor storing said fourth packed data in said first register in response to receiving said intra-add instruction.

9. The computer system of claim 7, wherein said processor further comprises:
   a first register having stored therein said first packed data; and
   a second register having stored therein said second packed data.

10. The computer system of claim 7, wherein said storage area further having stored therein said first packed data and said second packed data.

11. The computer system of claim 7, wherein said data element G provides a higher precision than at least one of said data elements A, B, C and D.

12. The computer system of claim 7, wherein said data elements E and F each contains said predetermined number of bits.

13. The computer system of claim 7, wherein said data elements A, B, C, D, E, F and G are either unsigned or signed data elements.

14. A processor comprising:
   a first storage area for storing a first packed data containing at least an A and a B data element;
   a second storage area for storing a second packed data containing at least a C and a D data element;
   a multiply-intra-add circuit including:
      a first multiplier coupled to said first storage area to receive said A data element, and coupled to said second storage area to receive said C data element;
      a second multiplier coupled to said second storage area to receive said B data element, and coupled to said second storage area to receive said D data element;
      a third storage area coupled to said first multiplier and said second multiplier, said third storage area having a first field for storing an output of said first multiplier as a first data element of a third packed data, said third storage area having a second field for storing an output of said second multiplier as a second data element of said third packed data;
      an adder coupled to said third storage area to receive said first data element of said third packed data and said second data element of said third packed data; and
      a fourth storage area for storing an output of said adder as a data element in a fourth packed data.

15. In a computer system, a method for manipulating a first packed data and a second packed data, said first packed data having A1 and A2 as data elements, said second packed data having B1 and B2 as data elements, said method comprising the steps of:
   a) performing the operation (A1×B1) to generate a first data element C1 in a third packed data;
   b) performing the operation (A2×B2) to generate a second data element C2 in the third packed data;
   c) performing the operation of adding said first data element C1 in the third packed data and a second data element C2 in said third packed data to generate a data element D in a fourth packed data;
   d) storing said data element D in said fourth packed data in a storage area; and
   e) storing said data element D in said fourth packed data in a storage area.

16. The method of claim 15, wherein said second packed data further includes B3 and B4 as data elements, wherein step b) further comprising the steps of:
   b.3) performing the operation (A1×B3) to generate a third data element C3 in the third packed data;
   b.4) performing the operation (A2×B4) to generate a fourth data element C4 in the third packed data.

17. The method of claim 16, wherein step d) further comprises the step of:
   d.2) performing the operation (C3+C4) to generate a second data element E in the fourth packed data.

18. The method of claim 17, wherein step e) further comprises the step of storing said data element E in said fourth packed data in the storage area.

19. In a computer system, a method for manipulating a first packed data, said method comprising manipulating two data elements of said first packed data to generate a data element in a second packed data.

20. The method of claim 19 wherein the manipulating of said two data elements of said first packed data comprises adding said two data elements of said first packed data.

21. The method of claim 19 wherein the manipulating of said two data elements of said first packed data comprises multiplying said two data elements of said first packed data.

* * * * *